United States Patent [19]

Tasso

[11] 3,735,361

[45] May 22, 1973

[54] INFORMATION STORE SYSTEM HAVING DATA BLOCK SHIFT REGISTERS

[76] Inventor: Joseph N. Tasso, 18 rue de la Glaciere, 75 Paris 130, France

[22] Filed: Aug. 30, 1971

[21] Appl. No.: 176,117

[52] U.S. Cl. ..........340/172.5
[51] Int. Cl. ..........G11c 9/00
[58] Field of Search ..........340/172.5

[56] References Cited

UNITED STATES PATENTS

| | | | |
|---|---|---|---|
| 3,388,383 | 6/1968 | Shivdasani et al. | 340/172.5 |
| 3,471,835 | 10/1969 | Gribble et al. | 340/172.5 |
| 3,543,247 | 11/1970 | Schrem | 340/172.5 |
| 3,631,402 | 12/1971 | Field | 340/172.5 |
| 3,648,255 | 3/1972 | Beausoleil et al. | 340/172.5 |
| 3,654,622 | 4/1972 | Beausoleil | 340/172.5 |

*Primary Examiner*—Paul J. Henon
*Assistant Examiner*—Melvin B. Chapnick
*Attorney*—Kemon, Palmer, Stewart and Estabrook

[57] ABSTRACT

In an information processing system operating under the control of programmes of instruction-words on data blocks each of which is an orderly assembly of bits, an optimized average access store system comprises a plurality of block shift registers, each addressable as a memory section and each having a number of shift block positions at least equal to the total number of information block lines which may be stored in the memory section, and a selection device which upon reception of an address of a section and of an address of a block in said section controls a shift of the block lines in said section up to the coincidence of the addressed block with a read/write station associated with the addressed memory section. The selection device includes an addressing table which may or not be an associative address store or a random-access store and means for determining the optimal direction to impart to said controlled shift when the shift register constituting said section is shiftable in both directions. At least one index block may be provided in a block shift register, when desired, for easing and/or speeding the selection operations.

7 Claims, 9 Drawing Figures

INFORMATION STORE SYSTEM HAVING DATA BLOCK SHIFT REGISTERS

SHORT SUMMARY OF THE INVENTION

The present invention concerns improvements in or relating to information store systems adapted to processing systems which operate under the control of programmes of instruction-words for processing data blocks each constituted by an orderly assembly of bits. It more particularly concerns such stores of substantial capacity of blocks.

Whether or not a data processing system includes a fast access buffer store arrangement, an important problem is the access time of the data blocks in large capacity stores which must exist in the system. As known a the random access types of stores, usually made of magnetic cores, present the drawback of a too high cost per bit. The known semi-random access kinds of stores, even those capable of a fast delivery of the information, still have access times of too high a value: the average access time of an information word in a drum or disk magnetic store is equal to one-half of a rotation turn of the magnetic member; the average access time of an information in a looped shift or circulating register equals one-half of the time necessary to one complete turn of the information along said loop (one-quarter of said time only when the register may be controlled for a two-way circulation along the loop).

A shift register usually operates, as known, in a step by step progression of the contents of its cells. A step may comprise either a progression of a single register position or a progression of a definite number of such positions. In most kinds of shift registers the progression may be controlled bothways. A shift register may be provided with a fairly high capacity of bits up to two thousand and forty bits and more when desired. Several techniques may be used for making such shift registers as, for instance the MOS technique (MOS is an abbreviation for "Metal Oxide Semi-conductors") which enables the manufacture of logic and amplifier integrated circuitry adapted to be used as cascade-connected and translation controlled one-digit stores the assembly of which constitute a shift register, which may conveniently be looped and wherein the shifts may be controlled in both directions. Another known technique is the one named DTPL, an abbreviation for "Domain Transmission and Propagation Logics," a technique concerned with anisotropic magnetic channels along which magnetization wall domains can be propagated in a step by step controlled fashion. These and other techniques may be used for providing appreciably compact multi-register stores with a reasonable cost per bit.

An object of the invention is to provide an information store system making use of such shift registers for so handling data blocks therein that their access is optimized with respect to the statistical structure of the programmes in any information processing system of which such store system is a part, so that the apparent access time of the registers is of the same order of magnitude as the access time of random access types of information stores.

Another object of the invention is so to provide said information store system that the most probable working zones for the moving information in the store will dynamically position themselves near and around the read/write stations associated with the shift registers in said store during operation thereof from the programmes executed by the processing system.

According to a feature of the invention, an information store system comprises the combination of:

- a plurality of memory sections each one of which constitutes a block shift register made of as many bit shift registers as are bits in any line of a block, each one of said bit shift register having as many bit positions as are lines of blocks settable in said block shift register,
- means for simultaneously controlling the shifts of the bit registers in a block shift register,
- a plurality of read/write stations respectively associated with said block shift registers in a number at least equal to that of said block shift registers, and,
- a selection control arrangement responsive to any call including an address of a memory section and an address of a block in said memory section for controlling in the addressed memory section a shift of the lines of the blocks up to registration of the addressed block and a read/write station of said block shift register.

According to another feature of the invention, part at least of said block shift registers and said shift controlling means are adapted to operate both-way shifts in said registers and said selection control arrangement comprises means for deciding which way of shift is the one to control in a block shift register for a quicker selection of an addressed block thereof.

BRIEF DESCRIPTION OF THE DRAWINGS:

These and further features of the invention will be described in full detail with reference to the accompanying drawings, wherein.

With the description of said examples it will become apparent that the invention may further be reduced to practice in a number of possible fashions.

DETAILED DESCRIPTION

Figure 1:
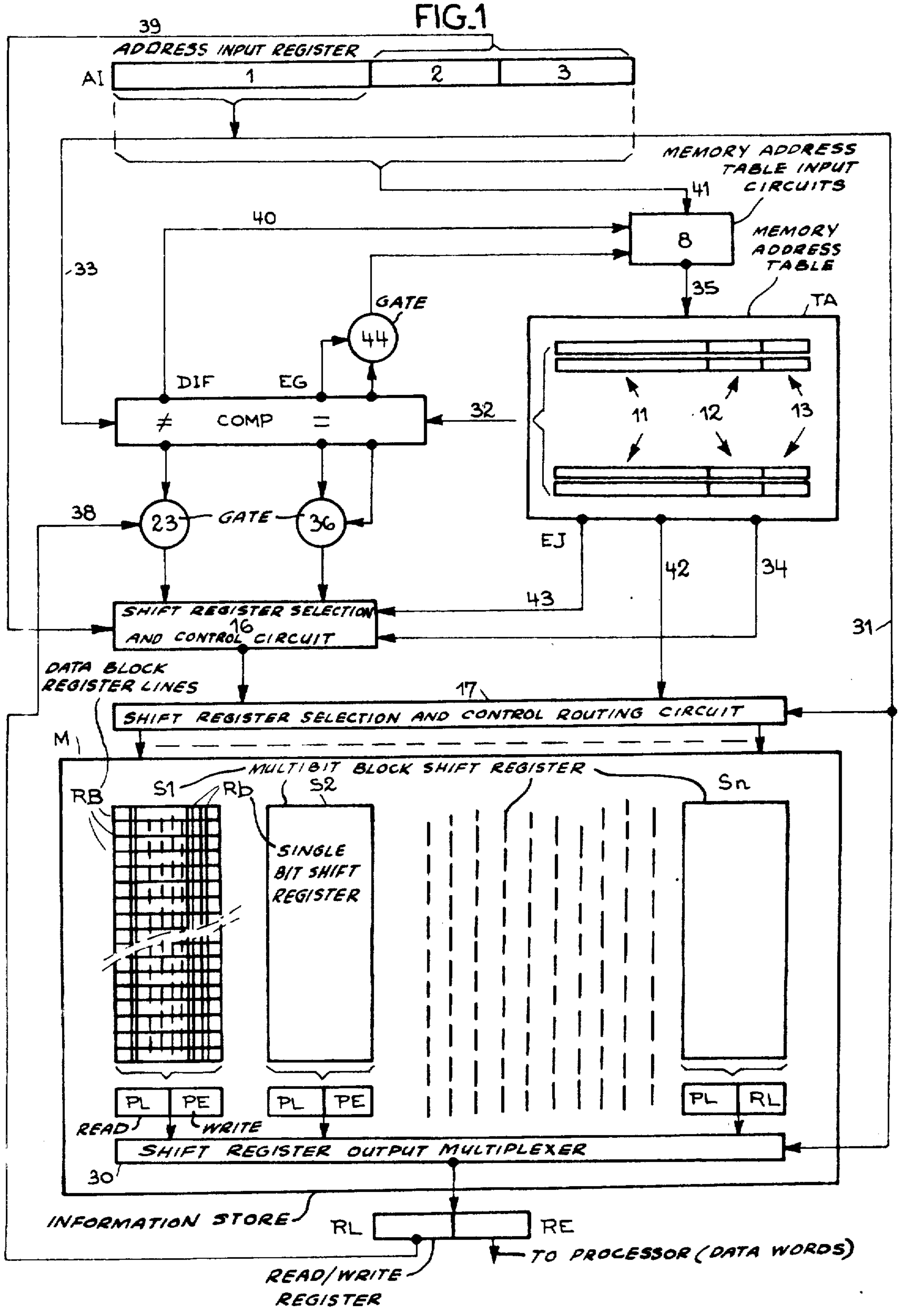
FIG. 1 shows one example of an information store system according to the invention.

In FIG. 1 is shown a large capacity information store M which is made of a plurality of memory sections, from S1 to Sn, each of which is a block shift register. Each one of the memory sections cooperates with a write/read station, PL-PE, the outputs of which are connectable through a routing circuit 30 to the read-out register RL and the write-in register RE of the store M. A table of block addresses is associated with the store M, and in FIG.1, said table is an associative table TA. The circuitry arrangement between M and TA will be later described. Each call from the processing system to the store introduces a block address in the conventional incoming address register AI. Said address word includes: in part 1 of the register,a memory section address; in parts 2–3 of the register, a block address in said section. When each memory section is organized in block pages or groups, part 2 is a group or page address and part 3 is the address of the block in the page or group. A decoded output of the content in part 1 of the register AI controls the routing circuit 30 for connecting the PL-PE station of the memory section identified by said address to the read-in register RE and the read-out register RL of the store. Each time an address is introduced into AI, and through a connection 39 responsive to such introduction, a block selection device 16 is activated for selecting a block of the address introduced in parts 2–3 of AI in the memory section adressed by part 1 of AI, connection 31 also controlling a routing circuit 17 for connection of the output of 16 to the control shift circuits of the adressed memory section.

Figure 2:
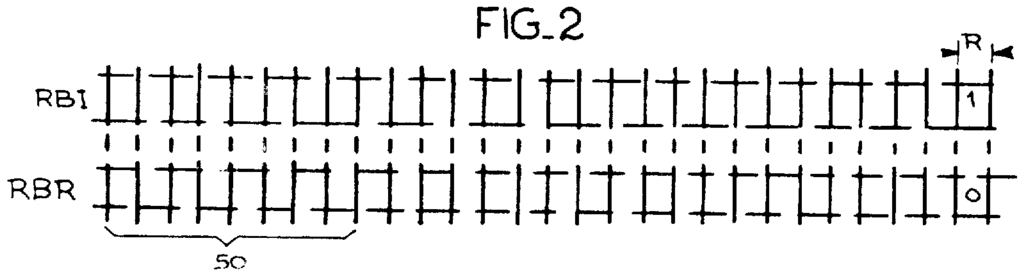
FIG. 2 shows one example of a block shift register in FIG.1.
Figure 3:
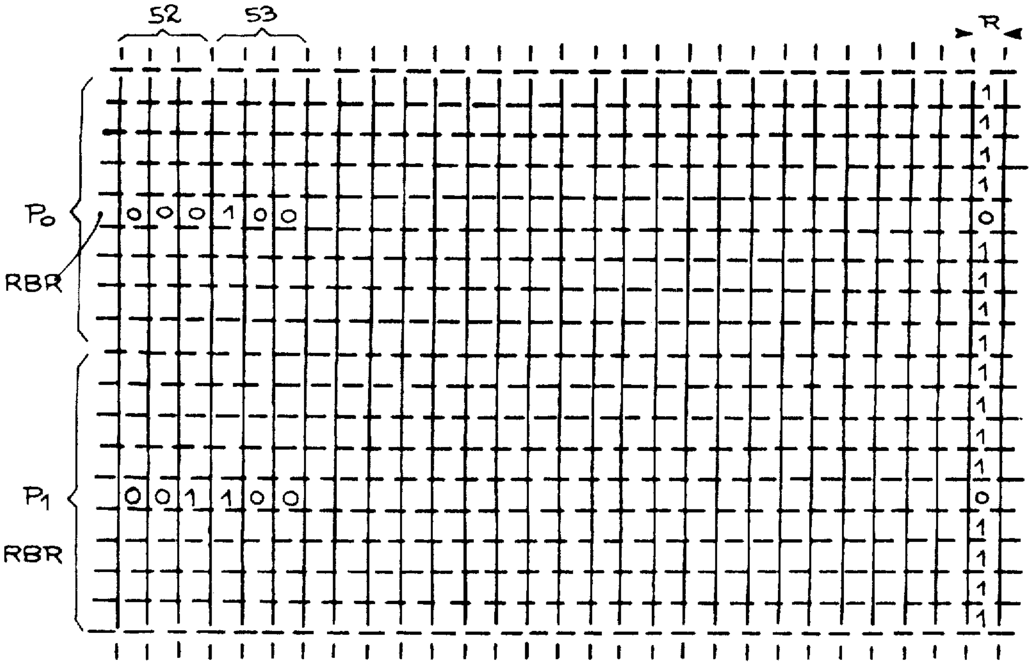
FIG. 3 shows another example of a block shift register in FIG.1.

In most applications of a store system according to the invention, two distinct types of block will be provided, i.e. a data block and an index block, respectively denoted RBI and RBR in FIG.2. Assuming for the sake of simplicity that each block only comprises one line of bits, each data block RBI may comprise a special bit R containing a bit of value 1 whereas each index block may comprise a special bit R of same position of value 0. Generally speaking, the index blocks of the memory sections are provided for relaying or completing the address table of the system, at least when said table is made with a number of lines definitely lower than the number of memory sections in the store M. When provided, an index block RBR must define the rank of the data block which immediately precedes or follows it. When initialized, an index block RBR receives in part 50 thereof a code made of a definite number of bits for identifying the rank of said preceding or following data block. An index block may be auxiliarly used for receiving other information such as keys and other servicing information which may casually, and when required, be copied in the table of addresses according to usual criteria of store information processing: illustratively, for instance, such additional initial data in an index block may serve to vary the format of the pages when the memory sections are organized in pages or groups of blocks. Such an organization is shown in FIG. 3 wherein two pages Po and P1 are illustrated, each made of nine blocks the middle one being an index block. Said index block, marked with a 0 in its R location, comprises a part 52 wherein is recorded a code representing the rank of the next following page in the memory section. Another part 53 of said index block may record a code representing the rank of the data block RBI which follows it in the page. This code in 53 is not at all imperative since, actually, the format is given in the address table,or in another conventional store of the processing system as the case may be. Similarly in certain applications, the 0 and 1 bit discrimination between data blocks and index blocks may be omitted if the memory of sequences of such blocks exists elsewhere in the processing system utilizing the store.

Figure 4:
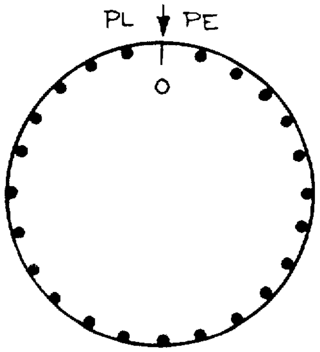
FIG. 4 is an example of a looped arrangement of a memory section in a store according to the invention.

FIG. 4 is a representation of a looped memory section which only comprises a single page of blocks. A single index block is shown at 0 for marking the beginning of the page. In the "rest" position of the memory section, this block is under the read/write station PL-PE. When said memory section is selected from an address in AI, the content of said index block O is transfered into the read-out register RL of the memory section store and may serve as a reference for the control of rotation around the looped shift register which will bring the adressed data block in said section in registration with the PL-PE station of said section.

Figure 5:
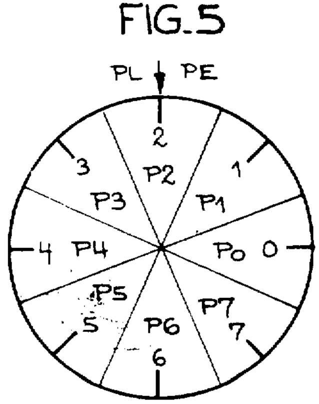

FIG. 5 is a representation of a looped memory section illustratively made of eight pages, P*o* to P7, each page comprising a page index block, from 0 to 7, and illustratively, it is the page index block No.2 which is registering with the PL-PE station of said memory section. This position indicates that, after a use of the memory section, said section has not been the subject of a further call. During a selection of a data block in the page, it is the selected data block which registers with the PL-PE station, as shown in FIG.6.

Figure 6:
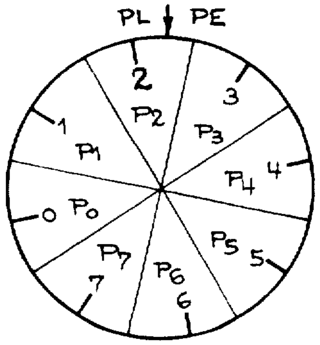
FIGS.5 and 6 show another example of a looped arrangement of a memory section which may be used in a store according to FIG.1.

In the examples shown in FIGS. 4 and 5–6, the block shift registers constituting the memory section are looped and it must be understood that the information may be shifted around said loop either in one direction or in the reverse direction. Actually, each block shift register constituting a memory section is made of a plurality of bit shift registers, such as R*b*, FIG. 1, said plurality comprising as many bit shift registers as are bits per block RB. The said bit shift registers Rb are simultaneously controlled in each section S for execution of the shifts of the blocks therein. When desired, the bit shift registers of a memory section may be physically assembled in sub-sections each of which may be made in a distinct module of integrated circuitry.

In the example shown in FIG.1, the address table TA may be an associative table comprising a certain number of lines, i.e. registers, adapted to receive an address of a memory section in part 11 and an address of data block in part 12–13. When the memory sections of the store are organized in pages or groups, the higher weight bits in 12 define the address of a page or group and the lower weight bits in 13 define the address of the data block within said page. Any address of memory section introduced in part 1 of the incoming address register AI must be compared, in this embodiment, with any and all addresses of memory sections existing in the parts 11 of the line registers of the table TA, an associative search of a well-known kind: a comparator COMP receives on one input thereof the code existing in part 1 of AI through a connection 33 and a further connection 41 activates a read-out of the codes recorded in parts 11 of the line registers of TA for application to a connection 32 to the other input of the comparator COMP. The arrangement may ensure a true simultaneous comparison of the code incoming at 33 and all the codes incoming at 32 (multiple connection of course in this respect). When the table TA is made with a few line registers, the comparison may be sequential provided the speed of operation is sufficient to make it appear simultaneous with respect to the timing of operation of the system which embodies the store and from which emanates the codes introduced in AI.

The comparator COMP exists in a normal associative table or memory organization and presents two distinct outputs; one of them, DIF, when activated, marks a negative comparison answer; the other of them EG, when activated, marks a positive comparison answer. When the comparator output DIF is activated, a control circuit 8 is unblocked through a connection 40 from DIF for controlling in the associative table TA the code existing in AI, through 35. Simultaneously as known the circuit 8, actually a part of the associative table, controls a re-arrangement of the data in said associative table. When said table was full, the fresh incoming address code will be recorded in a line register of TA marked in said table as recording a previous content which can be erased and the table issues at EJ a signal marking the "ejection" of such a content from the table. Concomitantly, the activation of the output DIF of the comparator unblocks a gate arrangement 23 for introducing in the selection device 16 the content of the read-out register RL of the store M through the connection 38. This content is that of a block which, in the selected memory section, registers with the PL station of said section. Since the address of the memory section is not in the associative table TA, this content is that of an index block of the section. The part 2–3 of the address in AI is introduced in 16 through the connection 39. The detail of the organization and operation of 16 will be herein below detailed.

When the output EG of the comparator COMP is activated, the code of the block address 12–13 for which the identity has been detected is introduced in the device 16, for instance through a gate arrangement 36 unblocked when EG is activated. Concomitantly, through a gate arrangement 44, the code of the rank of the line register of TA the content of which ensures an activation of EG is applied to the control circuit 8 for a re-arrangement of the content of the table TA. The device 16 received from AI through 39 the code of the fresh address of block introduced in part 2–3 of AI.

In either of the above defined conditions, the device 16 has received the fresh address of a block in a selected memory section and the code of the address of the block which, in this memory section registers with the PL-PE station. As said, the output of 16 is connected to the memory section through 17 which has been controlled from the output 31 of AI. From such conditions, the device 16 will control a shift of a number of steps for bringing the data block addressed in AI in registration with the station PL-PE of the memory section.

Said circuit 16 also controls operation in the store M responsive to the "ejection" of a content of a line register in the associative table TA. If no step were provided, the position of the information in the memory section corresponding to part 11 of said ejected content would be lost and this memory section could not be further used on further calls from the processing system. When the output EJ of the table TA is activated, it further activates the circuit 16 through the connection 43 and said circuit 16 receives through the connection 34 from TA the address code 12–13 of the block ejected from the associative table. A connection 42 is also activated for temporary substitution for 31 and consequently for temporary connection of the output of 16 to the memory section the address of which was in part 11 of the ejected line register content.

Figure 7:
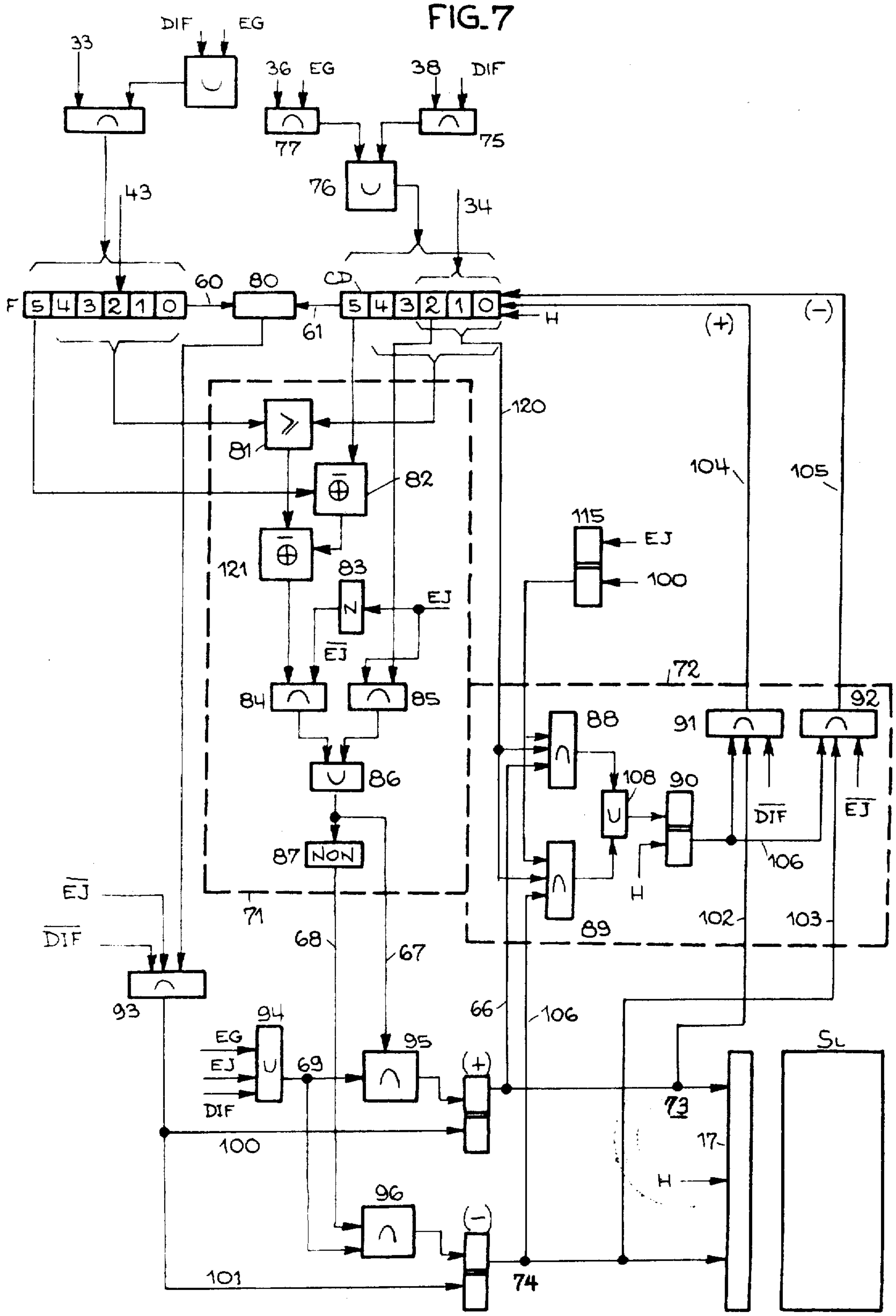
FIG. 7 shows one example of embodiment of the device shown as 16 in the example of FIG.1; and, FIGS.8 and 9 respectively show two examples of unidirectionally looped memory sections which may also be used in FIG.1.

Prior the description of an illustrative, though not limitative, embodiment of the circuit 16 in relation to FIG. 7 of the drawings, some remarks must be made: in most cases, the information processing system to which the store is associated operates on a programme of instructions wherein at each step of this programme it will need a narrow zone of a memory section of the store. During the execution of such a step of the programme, each operating zone in the store and more precisely in a memory section of said store, will be situated around the PL-PE station of this section. Consequently, most of the time any shift to control in the memory section will be only of a few steps for passing from an incoming block address to the next incoming block address in AI. As the table is re-arranged at each new call, the newly identified position is available for the selection control of the next further address. As long as this kind of operating condition is maintained, the index blocks will remain unused and the circuit 16 must only consider such index blocks to exist in view of the number of elementary shifts to be controlled for the addressed memory section. When, on the other hand, during the progression of a programme, a particular memory section remains unused during a sufficient time for an ejection from the table of the last working address in said section, the circuit 16 will, as said, operate to reset the memory section to a position whereat an index block is brought in registration with the PL-PE station of the section. When, FIGS. 5–6, the memory sections are organized in pages, the device 16 will be so programmed that it only ensures a minimal shift for bringing into registration with the said PL-PE station the index block of the last used page, that is to say a few number of elementary steps (at most four in the example illustrated in FIG.3).

The number of line registers to provide in the table TA is a matter of consideration wherein several factors may be taken into account, and such a choice of number of line registers will be herein later discussed.

The circuit 16 of FIG. 1 will now be described in relation to FIG. 7 as adapted for the case wherein each one of the memory sections comprises eight pages, each page comprising nine blocks the middle-one of which is an index block and the other ones of which are data blocks:

A register F receives the address of the block to position in registration with the PL-PE station of the concerned memory section each time a DIF signal or an EF signal is activated. As said, the shift operation leading to such a result may be followed, when the signal EJ is activated, a further shift operation for resetting the memory section the address code of which is ejected from the table TA. In this last operation, there is no possible change of page and the address to introduce in the register F may be an arbitrary one, as, for instance, a code 000 100 forced into F by the connection 43. The bit of the higher weight of a block address is equal to 1 in the above-described organization in pages of the memory sections.

The circuit 16 also includes a count-discount member CD. When the signal EG becomes of a "true" level, output EG being activated, said member CD receives from 36 and through the gate circuit 77 and the cascaded OR-circuit 76, the code of the address, prior any shift, of the block positioned in registration with the PE-PL station of the selected memory section. When, on the other hand, it is the signal DIF which comes true, said address code is introduced into CD from the connection 38 and through the gate circuit 75 and the cascaded OR-circuit 76. Further, when an ejection occurs in the table TA, the member receives a code through 34, activated from EJ, and, as in such a case, no change of page is possible, said code must be the same as introduced in F, i.e. for instance, the above-mentioned code 000 *xxx*, whereby the amplitude of the subsequent shift in the memory section will be at most equal to one-half of a page of blocks, not taking the index block into account of course.

A comparator circuit 80 receives at 60 and 61 the contents of F and CD and delivers a coincidence signal each time a coincidence is met between the applied codes. It is assumed that all signals EG, EJ, DIF came "false" as soon as the first clock pulse H is applied to CD. The number of bits in F and CD is equal to the number of bits in the part 2–3 of the incoming address code AI, FIG.1, which defines the number of bits to be compared by 80.

A circuit arrangement 71 is provided for determining which is the better direction to impart to the shifts for controlling the selected memory section. The "positive direction, marked (+) is for instance the direction in which the codes of addresses of blocks are increasing. The reverse direction is marked (−). The circuit arrangement 71 will be herein later described.

The organization of FIG.7 must satisfy three kinds of operations respectively corresponding to the activations of the outputs DIF, EG and EJ of FIG.1. Said signals are applied to an OR-circuit 94 and the shift operations proper start when the output of said OR-circuit comes to a true level. According to the decision from the circuits 71 that the direction of the shift must be a positive one or a negative one in the selected memory section, the output 67 or the output 68 of said circuits is activated. When output 67 is activated, a gate 95 is unblocked and the signal at 69 passes through said gate for actuating a bistable member (+). When output 68 is activated, it unblocks a gate 96 and the signal at 69 passes through said gate and actuates a bistable member (−). When the bistable member (+) is actuated, its output activates a connection 73 which, through the routing circuit 17 reaches the shift control circuit of that direction in the memory section Si so that the clock pulses H are applied to said "positive" shift control circuit for S*i*. The activation of 73 also controls through a gate 91 the (+) control input of the count-discount member CD to which are applied the clock pulses H. When, on the other hand, the bistable member (−) is actuated, it activates a connection 74 which, through the routing circuit 17 reaches the "negative" shift control circuit in the memory section S*i* and the clock pulses H will then actuate this control circuit. The activation of 74 also controls, through a gate 92, the (−) control input of CD. In both conditions, the shift in S*i* is automatically carried or until the comparator 80 issues a signal detecting the identities of the contents of F and CD and, through the OR-circuit 93, resets either the bistable member (+) through the connection 100 or the bistable member (−) through the connection 101, as the case may be, provided gate 93 is conducting that is to say when neither EJ nor DIF is activated. The resetting of the bistable member stops the shift in S*i*.

When the signal EJ or the signal DIF is "true", it may be that, prior to any shift, the contents of F and CD are equal. When DIF is true, CD records a code *xxx*100 and F may record the address of a data block following an index block in the section, consequently, a code *xxx*100. Notwithstanding said identity, the shift must not be inhibited in S*i*. The circuits 71 activate the "positive shift" output 67, the bistable member (+) is actuated but the gate 91 is blocked from an application of the signal $\overline{DIF}$ on one of its inputs. After the first shift step, DIF turns "false" and the shift operation is stopped. The required one step shift has been made. In the symmetrical case when EJ is true, CD may store a code such as 000100 which is also the code introduced into F for such a condition. The memory section must be controlled for a single step shift in the "negative" direction. The application of the signal $\overline{EJ}$ to the inputs of the circuits 93 and 92 ensures the required single step shift whereas CD is blocked,since the circuits 71 issue at 68 the negative shift control signal for activation of the bistable member (−) and the subsequent activation of the connection 74. After the first shift step, EJ comes "false" and the shift control of Si is deactivated.

When the memory section includes one or more index blocks the passages through such blocks must not activate the member CD whereas the bistable member (+) or the bistable member (−), as the case may be, must control the shift in the memory section. Each time the connection 120 finds in CD the code 011, CE then containing $\overline{CD2}$–CD1–CDO and the output connection of (+) is at a true level, the circuit 88 activates the bistable member 90 through the OR-circuit 108 and said member 90 from its output 106 blocks the transfer circuit 91 and inhibits the coùnt or advance input of CD through the connection 104. The symmetrical case is when the connection 120 reads the code 100, i.e., the content CD2–$\overline{CD1}$–$\overline{CDO}$ in CD. The bistable member (−) being actuated, the circuit 89 actuates 90 through 108 and consequently blocks the circuit 92. The discount input of CD is consequently inhibited through 105. The bistable member 90 is reset by the next clock pulse. The transfer circuits 88 and 89 are blocked when EJ is true, which condition actuates a bistable member 115 which is reset, for unblocking 88 and 89 when the level of the connection 100 from 93 comes true. It must be understood that, for a shift control operation which follows an ejection from the table TA, the bistable member 90 must not be actuated since the final address of the memory section is that of an index block and in this case, CD must take this block into account.

The circuits 71 which decide the optimum shift direction comprise a circuit 82 which detects the identity of the higher weight digits in F and CD, i.e. the identity of the contents of the parts F5 and CD5, and a processor circuit 81 the output of which is only of a true level when the content of the part F4 - - - FO of F is higher than the content of the part CD4 - - - CDO of CD. The outputs of 81 and 82 are applied to the inputs of a circuit 121 the output of which is activated only when the outputs of 81 and 82 are both "true". The output EJ of FIG.1. is applied to a NOT-circuit 83, the output signal is $\overline{EJ}$. When the output of 121 is "true" and no ejection condition exists, the circuit 84 applies to the connection 87 through the OR-circuit 86 a signal which, through the transfer circuit 95, actuates the bistable member (+). The connection 68, which is connected to the output of a NOT-circuit 87 following the circuit 86, is brought to a false level which inhibits the actuation of the bistable member (−). When on the other hand the outputs of 81 and 82 are at different levels, the same circuits activate the connection 86 which comes "true" and the direction of the shift will be the negative one. When an ejection occurs from the table TA, EF is "true" and if $\overline{CD2}$ is also "true", the output of 85 comes "true" which, through the OR-circuit 86, activates the connection 67 and controls a positive direction for the shift. When EJ is "true" and $\overline{CD2}$ is "false", the connection 68 will be activated and the shift will be made in a negative direction.

It has been described that a discrimination between the data blocks RBI and the index blocks RBR may be provided from the different values of the binary digit in their R position. Such a bit is of course carried through the connection 38. Said bit may be used when desired for inhibiting the action of the connections 104 and 105 on CD when it is an index block discriminating bit. In this respect, the wire, or line, in the connection 38 which carries such a R position bit will be connected to a circuit responsive to a 0 value of the bit for operating such an inhibition of CD. Such an arrangement may be used either for re-inforcing the viability of the member 16 for "jumping" over the index blocks or for plain substitution to the above-described circuit arrangement for "jumping" over such blocks.

The arrangement disclosed in FIG.7 is illustrative though not limitative per se. The conditions which must guide any reduction to practice of the circuit arrangement 16 in the conditions which have been recited with respect to FIG.1 may be stated as follows:

When the comparator COMP of FIG.1 issues an EG signal, the initial address in F points to a data block RBI of the same memory section that the data block addressed in AI. The control of the shift in said memory section must be operated in the optimum direction as defined by the circuits such as those at 71 up to the appearance of a stop signal at the output of 80 which compares the fixed code in F to the code in CD which varies as the shift progresses (except for the passages of the index blocks if any).

When COMP issues a signal DIF, the initial address in F may be either of the *xxx*100 type or of the *xxx xxx* type. The initial address in CD points to an index block RBR, as being of the *xxx* 100 type and the final address in CD will be such as to point to a data block RBI in F. When the initial address in F is a *xxx* 100 code, a single step shift must occur without a modification of the code in CD. When the initial address in F is not of this type, the operations must follow the same scheme as in the case when COMP issues an EG signal.

When the eject signal EJ appears, the final code in F points to an index block RBR and is of the 000 100 type. When the initial address code in CD is identical to the one in F, a negative single step shift must occur without any change in CD. If the initial address code in CD is of the 000 *xxx* type, distinct from the code in F, a shift must be operated in a direction defined by the content of CD2, until the required index block RBR is reached in the memory section, CD must take the step enabling the obtention of the RBR block since the problem is to reach an index block while starting from a data block. The code configuration 000 in CD is arbitrarily provided as, in the concerned case, there is no possibility of a change of page or group of blocks during a shift operation.

It may be noticed that, in a DIF condition, the initial block always is of the RBR kind and the block which is finally reached by the shift is of the RBI kind whereas, in an EG condition, both the initial and final blocks are of the RBI kind and, in an EJ operation, the initial block is a RBI one and the final block is a RBR one. Consequently an index block can only be reached in an ejection condition. When it is estimated useful to reach an index block in a DIF or EG condition, additional shift step (s) must be provided after the memory section reached the RBI final block up to a position of a RBR block. This may be obtained from the programme of the system which may force an EJ signal to this respect on the input of the control circuit 16 through a gate arrangement unblocked at the stop signal of a shift operation from the comparator 80 of FIG.7.

Figure 8:
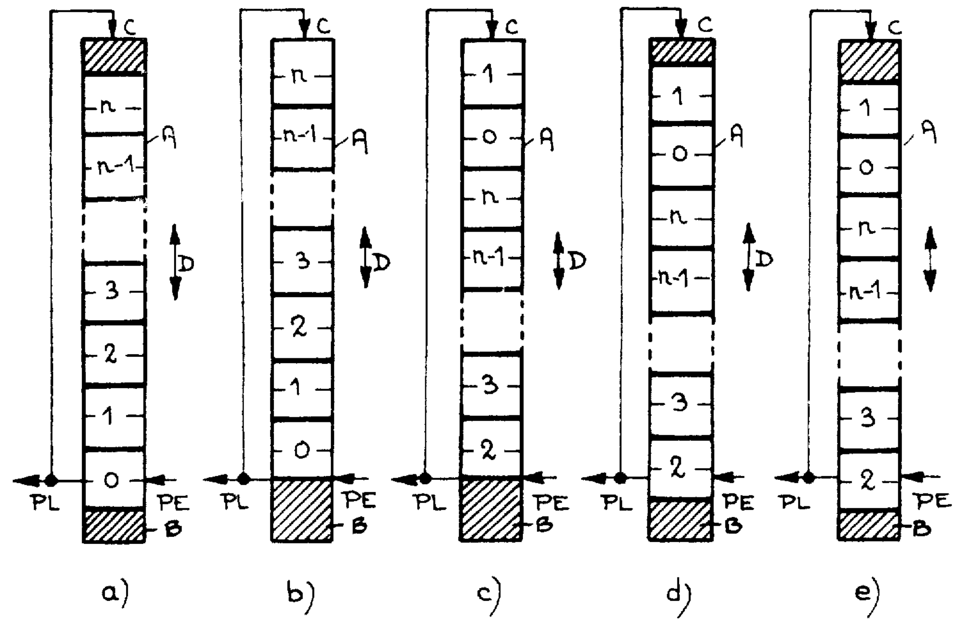
Figure 9:
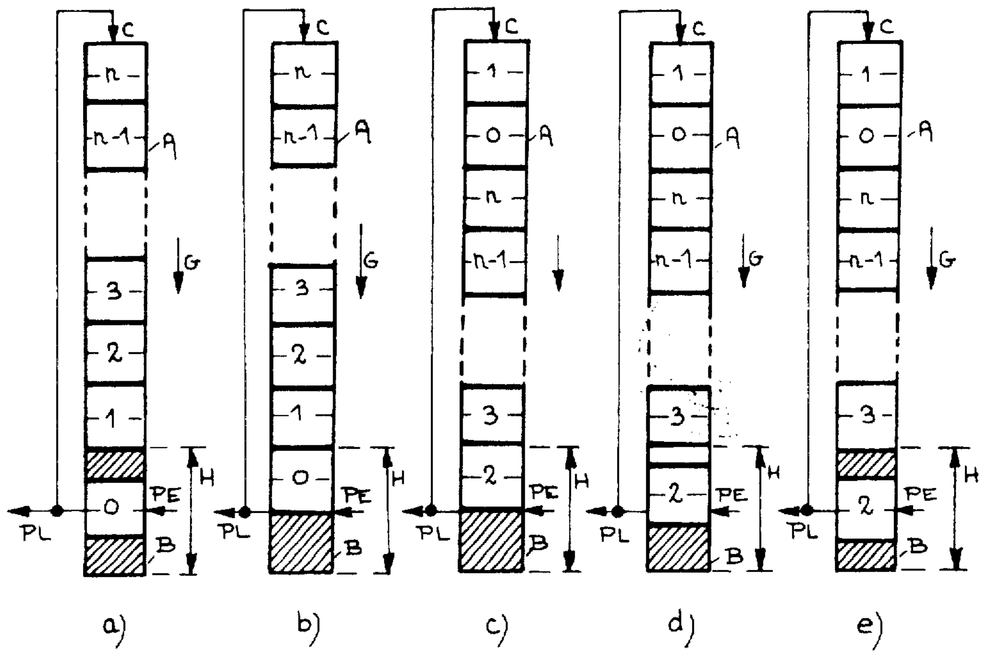

FIGS.8 and 9 show modifications of the memory sections and controls thereof. In these Figures a memory section comprises an externally looped memory section block register A and a linear shift register portion B, which is not looped and may consist of a few positions, for instance as many positions as are blocks in a page or a group when the part A is organized in pages or groups of blocks. A looped block shift register A is shown provided with an external loop connection from a read-out station PL to a re-write station C. The linear shift register B is shown physically related to A though of course it may be physically distinct and connected to A by means of external connections including the appropriate read-out and re-write stations.

In FIG.8, both registers A and B are such that the information therein can be moved in both directions, see the arrow D. In FIG.9, on the other hand, the major part of A is such that its content can only be moved in one direction according to the arrow G though, near the station PL-PE, a part of A can be controlled for a two cirection shift. The length of said part may be that of a page in the illustrated examples of FIGS.8 and 9. The part of the overall memory section wherein the shifts may be made in the one or the other direction of circulation of the information has a two-page length in FIG.9. In both FIGS.8 and 9, the total number of pages of the memory section structure is provided higher by one page to the number of pages which will be actually used for the information proper.

In FIG.8 as in FIG.9, the memory section is shown in five distinct conditions, from *a*) to *e*). In condition *a*), the index block of page O registers with the station PL-PE which implies that the memory section is not indexed in the associative table. Each page comprises eight blocks RBI and one index block RBR in between the two pairs of four blocks in said page. It is assumed that the address in AI, FIG.1, requests an operation on block No.6 of page No.2 which must consequently be brought into registration with the PL-PE station of the section.

Referring now to FIG.8, the first shift control is a half-page shift upwards, which brought the memory section in the condition *b*) and the second shift control is a circular or loop shift which brings the fore block of page 2 facing the PL-PE station, a condition shown at *c*). The next shift control is a downwards shift which brings the block No.6 of page No.2 in registration with the PL-PE station, a condition which is shown at *d*) and which is the position given by the block address in AI and which is now stored in the associative table TA. Any further call concerning page No.2 of this memory section will be quickly satisfied as obvious. When, later in the course of the programme, the memory section is abandoned, then, on the ejection of the address of said memory section from the associative table TA, the index block of page 2 will be brought, as described in relation to FIG.7, registering with the PL-PE station of the memory section, a condition which is shown at *e*) in FIG.8.

The hatched parts of the section in each one of the five conditions of operation indicate the parts of the section which are temporarily free of any information and index blocks.

In FIG.9, a two-direction shift control can only be ensured within a height H covering one page of A and the one page height of B. As in FIG.8, the PL-PE station is positioned facing the lowest position of a block in A or, if preferred, the highest position of a block in B. In the rest condition of the memory section, the index block of a page faces said station and the distinction between the conditions *a*) and *e*) respectively of the memory sections shown in FIGS.8 and 9 lies in the fact that, in FIG.9, the page the index block of which is so positioned is separated from the next page of the section by a one-half page height. The initial condition of the memory section is shown at *a*) with the index block of page No.O facing the PL-PE station. The first control ensures an upwards shift by one-half of a page, restricted to the part of the section wherein such an upwards shift is possible, of course, which brings the memory section in the condition shown at *b* ). Thereafter a permutative shift in the direction of the arrow G occurs which brought the lower block of page No.2 in registration with the PL-PE station, a condition shown at *c*). Then and without interruption of course in the actual control, an additional shift brings the block No.6 of page No.2 in due registration with the PL-PE station. Finally, when the memory section address is ejected from the associative table, the control is such that the index block of page No.2 is brought to face the PL-PE station of the section.

For controlling such arrangements as illustrated in FIGS.8 and 9, the control circuits of FIG.7 may be used provided a complementary organization ensures the preliminary step of driving upwards the page facing the PL-PE station by a height equal to one-half of the page (index block discounted as previously explained in such an upwards shift), which means a definite number of elementary steps in, for instance, the "negative" direction, when the signal DIF comes true. Consequently for instance, the appearance of a signal DIF may simultaneously actuate the bistable member (−), launch a counter of a number of clock pulses equal to one-half of the number of blocks in a page and temporarily inhibit the gates 95, 96 and 89 up to the return to zero of said counter.

It may be useful here to summarize a well-known method for controlling the operation of an associative table having a number K of line registers numbered from $L_o$ to $L_{k-1}$, the corresponding equipment being equally well-known per se: Each "call", i.e. each fresh introduction of an address into AI produces through the operation of the control circuit 8 a translation of the contents of the line register $L_{i-1}$ to the line register $L_i$ of the table, the suffix *i* being indicative of any and all values from 0 to *n*, the value *n* being indicative of the rank of the register in the table which makes the signal EG come true. After such internal transfers are executed, the fresh content of AI is transferred within the line register $L_o$ of the table. When DIF comes true, such transfers are also operated and the organization of the table decides the number n to be equal to (k−1). For each one of transfers from $L_{k-2}$ to $L_{k-1}$, the previous content of $L_{k-1}$ is ejected from the table and EJ turns true provided $L_{k-1}$ was actually storing an address. No ejection occurs as long as $L_{k-1}$ does not store an address.

When it is decided that the associative table can have a number of line registers equal to the number of memory sections, the arrangement may be simplified in that no more ejection may occur. Simplification appears obvious since it consists of cancelling in the system, and specially in FIGS.1 and 7, all connections and members which concerned the ejection problem existing when the table was of a restricted number of line registers. A further simplification is that, as it is no more imperative to have an associative search in the table as concerns the memory sections, parts 11 of the line registers can be omitted too and consequently the part of the arrangement relating to a comparison in or from the associative table of the addresses of the memory sections: the comparator COMP of FIG.1 and its related circuitry will then be omitted too. Factually, the table turns to a mere memory of as many line registers as are memory sections in the store and, when the line registers in the store memory TA, each line register only storing a block address 12–13, corresponds to the progression of the addresses of the memory section in (M), a plain and conventional decoder of the part 11 of any fresh address in AI will directly select the corresponding line register in the table for application of its 12–13 content to the circuit arrangement 16 wherein it is compared to the content of the parts 2–3 of the AI register (registers F and CD and comparator 80 in 16).

A further simplification may be made to the above-described embodiments of the invention when the table is provided with as many line registers as are memory sections in the store (M): index block may be omitted and consequently the circuits provided for "jumping over" such index blocks will be omitted in the circuits of FIG.7, as well as such connections as 38 in FIG.1. With such a simplified scheme, each memory section merely remains in its last called position which is a position then recorded in the table. It may be however considered as of advantage to preserve a single index block, as in present FIG.4 as a guarantee against a deterioration of the contents of the table and/or as a facility for initializing the storing of blocks in the sections.

Up to now, it has been considered in the above that any one-bit register member of the blocks and memory sections was of a staticised kind in that, once loaded with a bit value, it preserves said bit value during the intervals between actuation of the memory section of which it forms an element. The invention may however be used when such one-bit registers are of a "volatile" kind, i.e. when such bit-registers need to have their bit values systematically freshened when not actuated. It is usual in shift registers made of such "volatile" information one-bit elements to have the information permanently circulate, a scheme which is obviously impossible to use in embodiments of a store system according to the invention. However, it is contemplated in the invention that the shifts may be made in both directions when the registers are actuated. From that remark, it appears that "volatile" one-bit elements may be used for the reduction to practice of the invention, when desired, by providing a permanent to and fro movement of the information by one step (or a few steps) alternately in the "forward" and "backward" directions when the concerned memory section is not involved in a read-in or a read-out operation. The shift control circuits of the memory sections are easily adapted to such a condition, said circuits being included in part 17 of FIGS.1 and 7. Each one of said shift control circuits may be provided with a flip-flop receiving the clock pulses through an AND-gate blocked by the signal on 31, FIG.1. One of the outputs of said flip-flop controls a one-step forward shift of the information in the memory section, the other output of said flip-flop controls a one-step backward shift of the information in said memory section. As long as the memory section is not concerned in a read-in or a read-out operation, said AND-gate is conducting and the alternate activations of the outputs of said flip-flop controls an alternate change of condition of the memory section by driving the information thereof alternately one step forward and one step backward. When a signal on 31 blocks said AND-gate, this alternation of one-step shift is stopped for enabling the shift of information as determined by the comparison of the F and CD contents in circuit 16. In order to determine on which position, the backward one or the forward one is the true one when the memory section is called, signal 31 may be applied to the AND-gate only when the flip-flop is in a defined one of its positions. In this respect, for instance, this AND-gate is controlled by said signal through an upstream AND-gate receiving the signal from 31 and controlled from one of the outputs of the flip-flop. Another process may be used, comprising a read-out of the condition of the flip-flop when stopped and, according to said condition, adding or not a lowest weight bit 1 value in CD.

The "volatile" bit storing elements may be found in the MOS technique as well as in the so-called "potential pit" technique. Further, in each one of these techniques, it may be that a single one-digit storing member be of a non-amplifying kind. In such a case, as known, from place to place in a register made of such elements, it is usual to interpose a regenerative amplifier. For such a kind of registers, the alternate shift control may be of several steps so that, at each step, a regenerative amplifier is reached. This will not change the above-described arrangement except that at each change of condition of the flip-flop such number of steps as necessary are controlled in each direction of the shift.

It may be too that each one-bit "volatile" storing element be made of two successive cells. The above scheme is not changed except that the shifts controlled by said flip-flop may be of only a one-half step at each alternation.

It may be noted that, when the table is provided with as many line registers as are memory sections in the store (M) the information inputs of FIG.7 are: an input receiving the code read-out from part 2–3 of AI for loading F and an input receiving the code read-out from part 12–13 of a line register for loading CD.

What is claimed is:

1. For a programme-controlled information processing system operating on multi-bit data blocks, a large capacity random access like store, comprising:

a plurality of addressable memory sections each having simultaneously controllable shift registers equal in number to the number of bits in a data block to constitute a data block shift register of addressable block line positions and being individually controllable for a step-by-step operation in both directions;

a memory request address code register, each address code therein comprising a memory section address code and a data block position address code;

a table for memorizing data block position address codes up to at most one data block position address code per memory section;

first and second data block position address code registers;

means responsive to the introduction of a fresh memory request address code into said memory request address code register for transferring the data block position address code of said memory request to said first data block position address code register, transferring the data block position address code of the location of the table corresponding to the addressed memory section of said fresh request to the said second data block position address code register and substituting at said location of the table the fresh data block position address code for the former one;

means detecting the sign of the difference between the codes in said first and second data block position address code registers;

means responsive to the output of said sign detecting means for conditioning an activation of a step-by-step rotation of the addressed memory section in the direction defined by said sign and for simultaneously controlling a step-by-step modification of the content of said second data block address position register in a direction defined by said sign; and means permanently comparing the contents of said first and second registers during said modification of content of said second register up to code equality and stopping the activation of the rotation in the addresses memory section and the modification of said content when such equality is detected.

2. A store according to claim 1, wherein at least one read-write station is associated with each memory section and wherein at least one index block is provided intervening between data blocks, recording a distinctive configuration code with respect to any data block configuration code, in each of the said memory sections, comprising the further combination of:

means detecting the position at said read-write station of the said index block and temporarily stopping the modification of the content of said second register at each such detection.

3. A store according to claim 1, wherein said table comprises as many data block position address code locations as there are memory sections and said table is addressable from a decoder of the memory section address code in said memory request address code register.

4. A store according to claim 1, wherein said table comprises as many data block position address code locations as there are memory sections and said table is associately addressable from the memory section address codes in said memory request address codes from said register.

5. A store according to claim 1, wherein said table comprises a restricted number of code locations with respect to the number of memory sections and is of the associative search type including a rejection arrangement of part of its content for accomodation of fresh content therein, comprising the further combination of:

means for detecting the position address of a data block on which an addressed memory is stopped;

comparator means comparing the memory section address code in a fresh memory request address code with the memory section address codes of the content of said table;

means responsive to a positive answer of said comparator means for enabling the said means transferring into the second data block position address code register the data block position address code from the memory section addressed location of said table; and means responsive to a negative answer from said comparator means for introduction of the position address code from said detecting means into the second of said registers.

6. A store according to claim 5, further comprising:

means defining a predetermined position address code of a data block in the said memory sections; and means activated on a rejection operation of the said table, introducing the said predetermined position address code into the first of said registers and the data block position address code of the rejected information into the second of said registers.

7. A store according to claim 1, wherein the said shift registers are of the volatile bit storing type, said system further comprising:

means controlling a permanent to-and-fro shift of a small amplitude in any unaddressed memory section; and means responsive to a memory section request in said memory request address code register for inhibiting the application of the output of said to-and-fro controlling means to the said addressed section.

* * * * *